F. L. WHITE.
SPRING TIRE.
APPLICATION FILED DEC. 2, 1915.
1,331,687.
Patented Feb. 24, 1920.
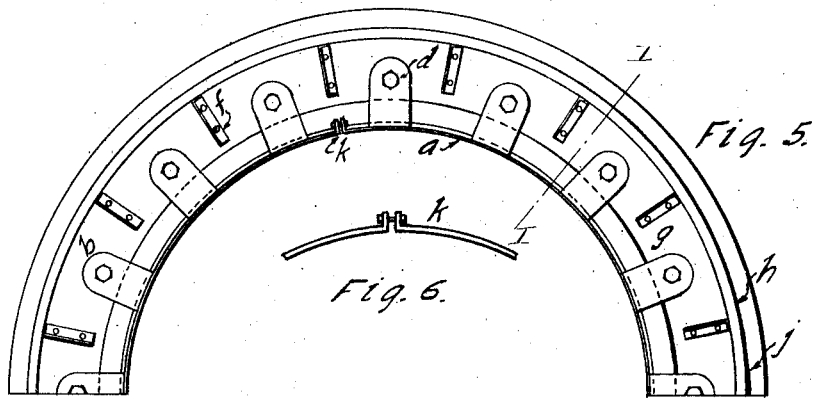
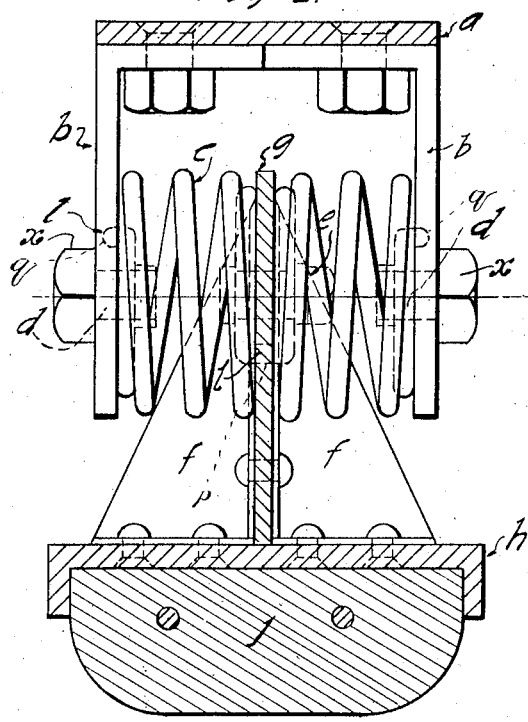
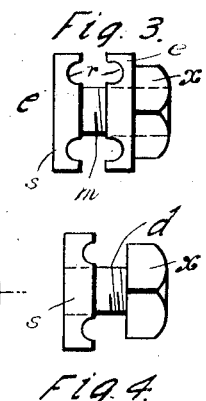
Witnesses.
L. A. Brandt
Carl S Callahan
Inventor
Frank L. White.

UNITED STATES PATENT OFFICE.

FRANK L. WHITE, OF LOUISVILLE, KENTUCKY.

SPRING-TIRE.

1,331,687.    Specification of Letters Patent.    Patented Feb. 24, 1920.

Application filed December 2, 1915. Serial No. 64,729.

*To all whom it may concern:*

Be it known that I, FRANK L. WHITE, a citizen of the United States, residing at Louisville, in the county of Jefferson and State of Kentucky, have invented new and useful Improvements in Tires for Vehicles, Motors, and Automobiles, which I have designated as Spring-Tires.

My invention relates particularly to and is intended for use on the wheels of automobiles and motor trucks of every description, and is designed and constructed to bring about the greatest degree of comfort with the least wear and depreciation in the wheel on which it is used. The device is to be of steel or other suitable material, and for increase of comfort may be faced with rubber if desired, especially where used on pleasure vehicles.

It will combine economy in cost of manufacture with quality of unusually long wear, and the effect of its action in practical use will be like that of a spring tire and having about the same resilient force as a pneumatic rubber tire pumped full of air. It will do away with puncture troubles, and will be easily attached to the wheels of all kinds of automobiles, motors and vehicles now in use and will be especially serviceable on wheels of heavy trucks.

In order that the construction may be understood I have illustrated the embodiment of my invention in the six figures of the drawings attached to this petition and specification, although the construction may be varied to a considerable extent from the disclosure which I now make without departing from the spirit and intention of my invention. The invention is described by reference to the drawings as follows:

Figure 1 is a transverse section of my improved tire taken on line 1—1, Fig. 5.

Fig. 2 is an end view of one of the spring members.

Fig. 3 is a side view of a locking means for securing one end of the spring member in position.

Fig. 4 is a side view of the locking means for securing the other end of the spring member in position.

Fig. 5 is a side elevational view of a portion of my improved tire.

Fig. 6 is a detail view of the means for securing the ends of the band which passes about the felly of the wheel.

Referring to the drawings wherein like numerals represent like parts in the several views, $a$ represents a metal band adapted to fit about the periphery of a vehicle wheel, such as an automobile wheel or wagon wheel. The ends of the band $a$ are outturned as shown in Fig. 6, so as to provide ears, these ears being apertured so as to receive a bolt $k$. By this arrangement, the band $a$ together with the parts carried thereby may be readily secured to vehicle wheels of the type now generally used, is being merely necessary to slip the band about the felly of the wheel and then tighten up the nut on the bolt $k$ so as to draw the band tightly about the periphery of the wheel.

Secured to the outer periphery of the band $a$ by means of bolts, rivets, or the like, in the present instance, bolts being disclosed, are a plurality of spaced apart clevises or U-shaped brackets $b$ having openings adjacent their outer ends.

The tread member of the tire comprises a thin cylindrical band $h$ which may have its edges flanged outwardly so as to provide a channel for the reception of a rubber-tire $j$. To the inner periphery of the band and intermediate its edges is secured a flat ring $g$ constituting an inwardly extending flange. The ring $g$ is secured to the band $h$ by means of brackets $f$. The brackets $f$ are secured to the flange $g$ and the band $h$ by means of rivets passing through the turned edges of the bracket as shown in Figs. 1 and 5.

The arms of the clevises or brackets $b$ straddle the flange $g$ of the tread member, as shown in Fig. 1. Each of the clevises $b$ is secured to the flange $g$ by a pair of coil springs $c$. The springs of each pair are mounted on opposite sides of the flange $g$ and are interposed between the flange $g$ and the arms of the clevises $b$. The springs $c$ are normally in extended condition, that is, under tension. The axes of the springs $c$ are parallel to the axis of the wheel to which they are secured. It will be noted by this construction that one set of springs is located to one side of the flange and another set of like springs are located to the other side of the flange, and the ends of the springs being secured to the flange $g$ and the arms of the clevises $b$, the tread member is resiliently maintained in correct position.

The end convolution at both ends of each of the springs are flattened so as to provide elongated loops $o$, and the ends of the loops terminate in outwardly projecting nibs $l$.

The inner ends of the springs c engage against the flange g and the nibs l engage in recesses p. The outer ends of the springs abut against the arms of the clevises, and the nibs l engage in recesses q in said arms. The opposed or inner ends of the springs are secured to the flange g by means of the bolts m, each having a head s, a nut x, and a washer e, shown in Fig. 3. The opposed faces of the head s and washer e are provided with grooves or notches r. The bolt m is adapted to extend through the ring g and the loops of the springs which engage thereagainst. When the nut x is turned the head s and washer e are drawn toward each other so that the sides of the loops o engage in the notches r and the ends of the springs are tightly secured to the ring g.

The outer ends of the springs c are secured to the brackets b by means of the bolt d having a head s and the nut x shown in Fig. 4. In this case, the bolt d extends through an opening in the arm of the clevis b and the outside loop o of the spring, and when the nut x is turned the head s clamps the loop o tightly against the inside of the arm of the clevis. By engaging the nibs l in the recesses p and q, the springs are held against rotation.

The manner in which my improved tire will function when in use is obvious from the above-description. The springs c provide the necessary resiliency and will absorb a greater portion of the shock to which the wheel may be subjected. As the springs c are normally under tension and this force is exerted horizontally, that is, in the direction of the axis of rotation, the load on the wheel is distributed equally to all parts thereof. Because the load is hung, so to speak, in the springs, and the springs are all held in tension, each spring performs its function of carrying its portion of the load. The springs absorb all shock and impact and come back to normal as soon as the load upon the tire is removed. The construction is very simple, and the durability and efficiency of the device is pronounced as there are no joints or bearings which are liable to be cut, and lubrication of the parts is not required. The load or strain of the vehicle is equally distributed on the two sets of springs and the construction is such that a wide range or resiliency is obtained which will insure ease and comfort to occupants of a car to which my device is applied. The construction may be economically manufactured and readily applied, and will take the place of pneumatic tires, at the same time, eliminating the disadvantages inherent in the latter. My improved construction eliminates to a large degree excessive oscillation on sudden stops or starts.

What I claim is:

1. A spring tire comprising a tread member, a wheel engaging band, clevises or U-shaped brackets secured to the outer periphery of said band, an internal circumferential flange on said tread member interposed between the arms of said brackets, coiled springs interposed between and having their end convolutions in direct engagement with said flange and the arms of said brackets, said springs being normally under tension and being in parallelism with the axis of rotation of the tire, and bolts having grooved heads receiving and securely clamping the end convolutions of each spring against rotary and sliding movement relative to and in direct engagement with a bracket and the band and thus preventing friction wear and noise between the springs and the abutting surfaces of the brackets or band.

2. A spring tire comprising a tread member, an internal circumferential flange on said tread member, a wheel engaging band within said flange, U-shaped brackets secured to the outer periphery of said band and having their arms straddling said flange, springs normally maintained under tension and horizontally interposed between said arms of said brackets and said flange, said springs having their end convolutions flattened to form elongated loops which are in direct engagement with the opposed surfaces of the brackets and flange, nibs on the ends of said springs adapted to engage in recesses in said brackets and flange, bolts extending through said flange and the loops of the springs engaging thereagainst, members on said bolts having grooves adapted to receive the sides of said loops, bolts extending through said brackets and the ends of the springs abutting thereagainst, and members on said last mentioned bolts having grooves adapted to receive the sides of said loops, the ends of said springs being maintained against rotary and sliding movement relative to said brackets and flange so as to prevent wear therebetween.

In testimony whereof, I have hereunto set my hand in the presence of two subscribing witnesses.

FRANK L. WHITE.

Witnesses:
G. A. BRANDT,
CARL S. CALLAHAN.